United States Patent
Zuk

(10) Patent No.: US 8,726,016 B2
(45) Date of Patent: *May 13, 2014

(54) INTELLIGENT INTEGRATED NETWORK SECURITY DEVICE

(75) Inventor: Nir Zuk, Redwood City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,067

(22) Filed: Sep. 14, 2012

(65) Prior Publication Data

US 2013/0067561 A1    Mar. 14, 2013

Related U.S. Application Data

(63) Continuation of application No. 12/575,997, filed on Oct. 8, 2009, now Pat. No. 8,332,948, which is a continuation of application No. 10/402,920, filed on Mar. 28, 2003, now Pat. No. 7,650,634, which is a continuation-in-part of application No. 10/072,683, filed on Feb. 8, 2002, now Pat. No. 8,370,936.

(51) Int. Cl.
H04L 29/06    (2006.01)

(52) U.S. Cl.
CPC ............ *H04L 63/02* (2013.01); *H04L 63/0209* (2013.01); *H04L 63/0218* (2013.01); *H04L 63/0227* (2013.01); *H04L 63/0263* (2013.01)
USPC ....................................... 713/165

(58) Field of Classification Search
CPC . H04L 63/02; H04L 63/0209; H04L 63/0218; H04L 63/0227; H04L 63/0263
USPC .................................................. 726/13, 165
See application file for complete search history.

(56) References Cited

U.S. PATENT DOCUMENTS

| | | |
|---|---|---|
| 5,598,410 A | 1/1997 | Stone |
| 5,606,668 A | 2/1997 | Shwed |
| 5,781,550 A | 7/1998 | Templin et al. |
| 5,835,726 A | 11/1998 | Shwed et al. |
| 5,842,040 A | 11/1998 | Hughes et al. |
| 5,909,686 A | 6/1999 | Muller et al. |
| 6,006,264 A | 12/1999 | Colby et al. |
| 6,049,528 A | 4/2000 | Hendel et al. |
| 6,052,788 A | 4/2000 | Wesinger, Jr. et al. |

(Continued)

FOREIGN PATENT DOCUMENTS

| | | |
|---|---|---|
| EP | 1 143 660 A2 | 10/2001 |
| EP | 1 427 162 A1 | 6/2004 |

(Continued)

OTHER PUBLICATIONS

International Search Report for corresponding PCT application, PCT/US2004/009607, dated Oct. 22, 2004, 3 pages.

(Continued)

*Primary Examiner* — Mohammad W Reza
(74) *Attorney, Agent, or Firm* — Harrity & Harrity, LLP

(57) ABSTRACT

Methods, computer program products and apparatus for processing data packets are described. Methods include receiving the data packet, examining the data packet, determining a single flow record associated with the packet and extracting flow instructions for two or more devices from the single flow record.

18 Claims, 9 Drawing Sheets

(56) References Cited

U.S. PATENT DOCUMENTS

| | | |
|---|---|---|
| 6,088,356 A | 7/2000 | Hendel et al. |
| 6,098,172 A | 8/2000 | Coss et al. |
| 6,119,236 A | 9/2000 | Shipley |
| 6,141,749 A | 10/2000 | Coss et al. |
| 6,154,775 A | 11/2000 | Coss et al. |
| 6,170,012 B1 | 1/2001 | Coss et al. |
| 6,205,551 B1 | 3/2001 | Grosse |
| 6,253,321 B1 | 6/2001 | Nikander et al. |
| 6,275,942 B1 | 8/2001 | Bernhard et al. |
| 6,279,113 B1 | 8/2001 | Vaidya |
| 6,301,668 B1 | 10/2001 | Gleichauf et al. |
| 6,304,975 B1 | 10/2001 | Shipley |
| 6,311,278 B1 | 10/2001 | Raanan et al. |
| 6,321,338 B1 | 11/2001 | Porras et al. |
| 6,370,603 B1 | 4/2002 | Silverman et al. |
| 6,421,730 B1 | 7/2002 | Narad et al. |
| 6,449,647 B1 | 9/2002 | Colby et al. |
| 6,453,345 B2 | 9/2002 | Trcka et al. |
| 6,466,985 B1 | 10/2002 | Goyal et al. |
| 6,487,666 B1 | 11/2002 | Shanklin et al. |
| 6,499,107 B1 | 12/2002 | Gleichauf et al. |
| 6,590,894 B1 | 7/2003 | Kerr et al. |
| 6,591,303 B1 | 7/2003 | Hendel et al. |
| 6,600,744 B1 | 7/2003 | Carr et al. |
| 6,606,315 B1 | 8/2003 | Menditto et al. |
| 6,633,560 B1 | 10/2003 | Tiwari et al. |
| 6,650,641 B1 | 11/2003 | Albert et al. |
| 6,654,373 B1 * | 11/2003 | Maher et al. ............ 370/392 |
| 6,704,278 B1 | 3/2004 | Albert et al. |
| 6,735,169 B1 | 5/2004 | Albert et al. |
| 6,742,045 B1 | 5/2004 | Jordan et al. |
| 6,768,738 B1 | 7/2004 | Yazaki et al. |
| 6,775,692 B1 | 8/2004 | Albert et al. |
| 6,781,992 B1 | 8/2004 | Rana et al. |
| 6,788,648 B1 | 9/2004 | Peterson |
| 6,795,918 B1 | 9/2004 | Trolan |
| 6,851,061 B1 | 2/2005 | Holland et al. |
| 6,856,991 B1 | 2/2005 | Srivastava |
| 6,976,154 B1 | 12/2005 | Dyckerhoff et al. |
| 6,981,158 B1 | 12/2005 | Sanchez et al. |
| 7,006,443 B2 | 2/2006 | Storr |
| 7,032,037 B2 | 4/2006 | Garnett et al. |
| 7,042,870 B1 | 5/2006 | Albert et al. |
| 7,051,066 B1 | 5/2006 | Albert et al. |
| 7,054,930 B1 | 5/2006 | Cheriton |
| 7,073,196 B1 | 7/2006 | Dowd et al. |
| 7,076,803 B2 | 7/2006 | Bruton et al. |
| 7,123,583 B2 | 10/2006 | Hoar et al. |
| 7,143,438 B1 | 11/2006 | Coss et al. |
| 7,185,368 B2 | 2/2007 | Copeland, III |
| 7,346,686 B2 | 3/2008 | Albert et al. |
| 7,376,085 B2 | 5/2008 | Yazaki et al. |
| 7,512,980 B2 | 3/2009 | Copeland et al. |
| 7,535,907 B2 | 5/2009 | Hussain et al. |
| 7,643,481 B2 | 1/2010 | Kadambi et al. |
| 7,650,634 B2 | 1/2010 | Zuk |
| 7,778,254 B2 | 8/2010 | Kadambi et al. |
| 7,895,431 B2 | 2/2011 | Bouchard et al. |
| 7,970,886 B1 | 6/2011 | Wetherall et al. |
| 8,023,413 B2 | 9/2011 | Kadambi et al. |
| 8,332,948 B2 | 12/2012 | Zuk |
| 2001/0028650 A1 | 10/2001 | Yoshizawa et al. |
| 2001/0051864 A1 * | 12/2001 | Kerr et al. .............. 703/27 |
| 2002/0032797 A1 | 3/2002 | Xu |
| 2002/0080789 A1 | 6/2002 | Henderson et al. |
| 2002/0124187 A1 | 9/2002 | Lyle et al. |
| 2002/0126621 A1 | 9/2002 | Johnson et al. |
| 2002/0161839 A1 | 10/2002 | Colasurdo et al. |
| 2002/0165956 A1 | 11/2002 | Phaal |
| 2003/0105976 A1 | 6/2003 | Copeland |
| 2003/0145225 A1 | 7/2003 | Bruton et al. |
| 2003/0149887 A1 | 8/2003 | Yadav |
| 2003/0149888 A1 | 8/2003 | Yadav |
| 2003/0154399 A1 | 8/2003 | Zuk |
| 2005/0141503 A1 | 6/2005 | Welfeld |
| 2005/0163132 A1 | 7/2005 | Mieno et al. |
| 2006/0005231 A1 | 1/2006 | Zuk |
| 2008/0115204 A1 | 5/2008 | Ramsey et al. |

FOREIGN PATENT DOCUMENTS

| | | |
|---|---|---|
| JP | 10-107795 | 4/1998 |
| JP | 11-316677 | 11/1999 |
| JP | 2000-312225 | 11/2000 |
| JP | 2001-077857 | 3/2001 |
| JP | 2001-313640 | 11/2001 |
| JP | 2002-524891 | 8/2002 |
| JP | 2003-78549 | 3/2003 |
| WO | WO 99/67930 | 12/1999 |
| WO | WO 03/025766 | 3/2003 |
| WO | WO 03/061238 | 7/2003 |

OTHER PUBLICATIONS

Stonesoft, 'StoneBeat Security Cluster White Paper,' Aug. 2000, Finland, pp. 1-9.

Stonesoft, 'Secure Highly Available Enterprise-A White Paper,' Feb. 2001, Finland, pp. 1-10.

Stonesoft, 'StoneGate White Paper,' Mar. 2001, Finland, pp. 1-6.

Stonesoft Corp. 'StoneGate,' product webpage, www.stonesoft.com/document/363.html, Mar. 27, 2001 (print date), pp. 1-2.

Stonesoft Corp. 'Next Level of Network Accessibility' webpage, www.stonesoft.com/document/183.html, Mar. 27, 2001 (print date), p. 1.

Stonesoft Corp., 'Platforms,' webpage, www.stonesoft.com/document/186.html, Mar. 27, 2001 (print date), p. 1.

Nokia, 'Technical White Paper: The IP Clustering Power of Nokia VPN-Keeping Customers Connected,' Apr. 2001, pp. 1-13.

Nokia, 'Nokia VPN Solutions—Nokia VPN CC2500 Gateway,' 2001, product information, pp. 1-2.

Nokia, 'Nokia VPN Solutions—Nokia VPN CC5200 Gateway,' 2001, product information, pp. 1-2.

Nokia, 'Nokia VPN Solutions—Nokia VPN CC5205 Gateway,' 2001, product information, pp. 1-2.

Axelsson, S., "Intrusion Detection Systems: A Survey and Taxonomy," Dept. of Computer Eng., Chalmers Univ. of Technology, Goteborg, Sweden, Mar. 14, 2000, pp. 1-27.

Avolio, F., "Firewalls and Virtual Private Networks," CSI Firewall Archives, printed Nov. 13, 2001, URL: http://www.spirit.com/CSI/Papers/fw+vpns.html, pp. 1-7.

Bace, R., "An Introduction to Intrusion Detection & Assessment," ICSA Intrusion Detection Systems Consortium White Paper, 1999, URL: http://www.icsalabs.com/html/communities/ids/whitepaper/Intrusion1.pdf, pp. 1-38.

Business Wire, Inc., "NetScreen and OneSecure Unite to Deliver Industry's First Total Managed Security Services Platform," San Jose, CA, Feb. 20, 2001, pp. 1-2.

Business Wire, Inc., "OneSecure Launches the First Co-Managed Security Services Platform," Denver, CO, Jan. 29, 2001, pp. 1-2.

Carr, Jim, "Intrusion Detection Systems: Back to Front?," Network Magazine, Sep. 5, 2001, URL: http://www.networkmagazine.com/article/NMG20010823S0007/2, pp. 1-9.

Check Point Software Technologies Ltd., Firewall-1® Technical Overview P/N 500326, www.checkpoint.com, Oct. 2000, pp. 1-29.

Cisco Systems, "Cisco IOS Firewall Intrusion Detection System," Cisco IOS Release 12.0(5)T, 2001, pp. 1-40.

Cisco Systems, "Cisco IOS Firewall Authentication Proxy," Cisco IOS Release 12.0(5)T, 2001, pp. 1-48.

Clark, D., "RFC815-IP Datagram Reassembly Algorithms," Internet RFC/STD/FYI/BCP Archives, http://www.faqs.org/rfcs/rfc815.html, Jul. 1982, pp. 1-8.

Copeland, Dr. John A., "Observing Network Traffic-Techniques to Sort Out the Good, the Bad, and the Ugly," PowerPoint Slide Presentation presented to ISSA—Atlanta, Jun. 27, 2001, pp. 1-22.

Denning, Dorothy E., "An Intrusion-Detection Model," IEEE Transactions on Software Engineering, vol. SE-13, No. 2, Feb. 1987, 17 pages.

(56) References Cited

OTHER PUBLICATIONS

Farrow, Rik, "An Analysis of Current Firewall Technologies," CSI 1997 Firewalls Matrix, 1998, URL: http://www.spirit.com/CSI/Papers/farrowpa.htm, pp. 1-5.
Firewall Product Comparison Table: VelociRaptor, BorderWare Firewall Server and Firewall-1/VPN-1 Gateway, www.spirit.com, printed Nov. 13, 2001, pp. 1-7.
Firewall Product Comparison Table: PIX Firewall, CyberGuard Firewall for UnixWare & CyberGuard Firewall for Windows NT, www.spirit.com, printed Nov. 13, 2001, pp. 1-8.
Firewall Product Comparison Table: CyberGuard Premium Appliance Firewall, InstaGate EX & BizGuardian VPN Firewall, www.spirit.com, printed Nov. 13, 2001, pp. 1-8.
Firewall Product Comparison Table: Server Protector 100, GNAT Box Firewall Software & Lucent Managed Firewall, www.spirit.com, printed Nov. 13, 2001, pp. 1-6.
Firewall Product Comparison Table: Internet Security and Acceleration (ISA) Server 2000, NetBSD/i386 Firewall & Guardian Firewall, www.spirit.com, printed Nov. 13, 2001, pp. 1-7.
Firewall Product Comparison Table: NetScreen-10 and NetScreen-100, CyberwallPLUS & BorderManager, www.spirit.com, printed Nov. 13, 2001, pp. 1-7.
Firewall Product Comparison Table: Gauntlet Firewall, Barricade Classic/XL & Barricade S, www.spirit.com, printed Nov. 13, 2001, pp. 1-8.
Firewall Product Comparison Table: Sidewinder™, SecurePipe Managed Firewall Service & SnapGear, www.spirit.com, printed Nov. 13, 2001, pp. 1-7.
Firewall Product Comparison Table: SonicWALL PRO, Sunscreen Secure Net & WinRoute Pro 4.1, www.spirit.com, printed Nov. 13, 2001, pp. 1-6.
Firewall Product Comparison Table: WatchGuard Technologies, Inc. LiveSecurity System 4.6, www.spirit.com, printed Nov. 13, 2001, pp. 1-4.
Graham, R., "FAQ: Network Intrusion Detection System," www.robertgraham.com/pubs/network-intrusion-detection.html, Ver. 0.8.3, Mar. 21, 2000, pp. 1-43.
Habra, N. et al., "ASAX: Software Architecture and Rule-Based Language for Universal Audit Trail Analysis," Proceedings of the ESORICS '92, European Symposium on Research in Computer Security, Nov. 23-25, 1992, Toulouse, Springer-Verlag, 16 pages.
ICSA Labs, Intrusion Detection System Buyer's Guide, ICSA White Paper, 1999, pp. 1-52.
Jackson, K. et al., "Intrusion Detection System (IDS) Product Survey," Los Alamos National Laboratory, Los Alamos, NM, LA-UR-99-3883 Ver. 2.1, Jun. 25, 1999, pp. 1-103.
Jones, Kyle, "Introduction to Firewalls," IT Audit.org Forum Network Management, vol. 2, May 1, 1999, URL: http://www.itaudit.org/forum/networkmanagement/f209nm.htm, pp. 1-5.
Lancope, "The Security Benefits of a Flow-Based Intrusion Detection System," White Paper, date unknown, pp. 1-11.
LapLink, Inc., "Article #178—Introduction to Firewalls," www.laplink.com/support/kb/article.asp?ID=178, Apr. 24, 2001, pp. 1-3.
McHugh, J. et al., "Defending Yourself: The Role of Intrusion Detection Systems," Software Engineering Institute, IEEE Software Eng., Sep./Oct. 2000, pp. 42-51.
Network ICE Corporation, "Why Firewalls Are Not Enough," at www.networkice.com/products/firewalls.html, 2000, pp. 1-9.
Power, R., et al., "CSI Intrusion Detection System Resource-Five Vendors Answer Some No-Nonsense Questions on IDS," Computer Security Alert #184, Jul. 1998, pp. 1-8.
Power, R., "CSI Roundtable: Experts discuss present and future intrusion detection systems," Computer Security Journal, vol. XIV, #1, URL: http://www.gocsi.com/roundtable.htm, 2001, pp. 1-20.
Sample, Char, et al., "Firewall and IDS Shortcomings," SANS Network Security, Monterey, CA, Oct. 2000, pp. 1-13.
Smith, Gary, "A Brief Taxonomy of Firewalls-Great Walls of Fire," SANS Institute's Information Security Reading Room, May 18, 2001, URL: http://www.sans.org/infosecFAQ/firewall/taxonomy.htm, pp. 1-21.
Spitzner, Lance, "How Stateful is Stateful Inspection? Understanding the FW-1 State Table," http://www.enteract.com/~lspitz/fwtable.html, Nov. 29, 2000, pp. 1-8.
Sundaram, A., "An Introduction to Intrusion Detection," www.acm.org/crossroads/xrds2-4/intrus.html, Jan. 23, 2001, pp. 1-12.
Tyson, Jeff, "How Firewalls Work," http://www.howstuffworks.com/firewall.htm/printable, 2001, pp. 1-7.
Xinetica, Ltd., "An Overview of Intrusion Detection Systems," Xinetica White Paper, Nov. 12, 2001 (print date), UL: http://www.xinetica.com/tech_explained/general/ids/wp_ids.html, pp. 1-9.
Zuk, Nir, "Protect Yourself With Firewalls," www.techtv.com, Jul. 12, 2001, URL: http://www.techtv.com/screensavers/print/0,23102,3325761,00.html, pp. 1-3.
Zuk, Nir, "How the Code Red Worm Works," www.techtv.com, Sep. 21, 2001, URL: http://www.techtv.com/screensavers/print/0,23102,3349133,00.html, pp. 1-2.
Petersen, S., et al., "Web apps pose security threat," ZDNet: Tech Update, Jan. 29, 2001, URL: http://techupdate.zdnet.com/techupdate/stories/main/0,14179,2679177,00.html, pp. 1-3.
Lancope, "StealthWatch Provides Early Detection of the Code Red Worm and its Future Variants," www.stealthwatch.com, date unknown, pp. 1-4.
Reavis, J., "Cash and BURN," Jun. 2001, 6 pages.
SOS Corporation, "An Introduction to Firewalls," 1995, URL: ,http://www.uclan.ac.uk/facs/destech/compute/staff/haroun/FIREWALS.HTM, pp. 1-3.
Morgan, Lisa, "Be Afraid, Be Very Afraid," InternetWeek Intrusion Detection Systems, Jan. 3, 2001, pp. 1-6.
Mullins, Robert, "'Cyber war' raises security concerns," Silicon Valley/San Jose Business Journal, May 11, 2001, pp. 1-4.
James P. Anderson Co., "Computer Security Threat Monitoring and Surveillance," Apr. 15, 1980, 56 pages.
Internet Security Systems, Inc., "REALSECURE™, The RealSecure Advantage," 2001, 2 pages.
Chuvakin, A., et al., "Basic Security Checklist for Home and Office Users," SecurityFocus, Nov. 5, 2001, pp. 1-5.
Network Ice, "SMTP WIZ command," 2001, URL: http://networkice.com/Advice/Intrusions/2001006/default.htm pp. 1-2.
Bace, R., et al., "NIST Special Publication on Intrusion Detection Systems," National Institute of Standards and Technology Special Publication, date unknown, pp. 1-51.
G. Navarro: A Partial Deterministic Automaton for Approximate String Matching, 1997, Department of Computer Science, University of Chile, 13 pages.
G. Navarro et al.: Improving an Algorithm for Approximate Pattern Matching, 1998, Department of Computer Science, University of Chile, 34 pages.
Network Magazine, vol. 2, No. 2, pp. 116-119 (with English abstract).
Software Design, Nov. 1996, pp. 39-58 (with English abstract).
Julkunen et al., "Enhance Network Security with Dynamic Packet Filter", IEEE (1998), pp. 268-275.
Sharp et al., "Starburst: Building Next-Generation Internet Devices", Bell Labs Technical Journal 6(2), pp. 6-17, 2002.

\* cited by examiner

INTELLIGENT INTEGRATED NETWORK SECURITY DEVICE

CROSS-REFERENCE TO RELATED APPLICATION

This application is a continuation of U.S. application Ser. No. 12/575,997, filed Oct. 8, 2009, which is a continuation of U.S. application Ser. No. 10/402,920, filed Mar. 28, 2003 (now U.S. Pat. No. 7,650,634), which is a continuation-in-part of U.S. application Ser. No. 10/072,683, filed Feb. 8, 2002. The disclosures of the prior applications are considered part of (and are incorporated by reference in) the disclosure of this application.

BACKGROUND

The present invention relates to a method for controlling computer network security.

Firewalls and intrusion detection systems are devices that are used to protect a computer network from unauthorized or disruptive users. A firewall can be used to secure a local area network from users outside the local area network. A firewall checks, routes, and frequently labels all messages sent to or from users outside the local area network. An intrusion detection system (IDS) can be used to examine information being communicated within a network to recognize suspicious patterns of behavior. Information obtained by the IDS can be used to block unauthorized or disruptive users from accessing the network. An intrusion prevention system (IPS) is an in-line version of an IDS. An IPS can be used to examine information as it is being communicated within a network to recognize suspicious patterns of behavior.

A flow-based router (FBR) can allow network administrators to implement packet forwarding and routing according to network policies defined by a network administrator. FBRs can allow network administrators to implement policies that selectively cause packets to be routed through specific paths in the network. FBRs can also be used to ensure that certain types of packets receive differentiated, preferential service as they are routed. Conventional routers can forward packets to their destination address based on available routing information. Instead of routing solely based on the destination address, FBRs can enable a network administrator to implement routing policies to allow or deny packets based on several other criteria including the application, the protocol, the packet size and the identity of the end system.

A packet filter can operate on the data in the network layer, to defend a trusted network from attack by an untrusted network. Packet filters can operate at the network layer to inspect fields of the TCP/IP header including, the protocol type, the source and destination IP address, and the source and destination port numbers. Disadvantages of packet filters include, speed (i.e., slow) and management in large networks with complex security policies. Packet filters alone may not provide robust protection because packet filters are not aware of the context of the given communication. In addition, packet filters do not inspect the data at the application layer making packet filters vulnerable to attempted security intrusions using the application layer.

A proxy server can operate on values carried in the application layer to insulate a trusted network from an untrusted network. In an application proxy server, two TCP connections are established: one between the packet source and the proxy server, another between the proxy server and the packet destination. The application proxy server can receive the arriving packets on behalf of the destination server. The application data can be assembled and examined by the proxy server, and a second TCP connection can be opened between the proxy server and the destination server to relay permitted packets to the destination server. Proxy servers can be slow because of the additional protocol stack overhead required to inspect packets at the application layer. Furthermore, because a unique proxy can be required for each application, proxy servers can be complex to implement and difficult to modify for supporting new applications. In addition, because proxy servers only examine application packets proxy servers may not detect an attempted network security intrusion at the TCP or network layers.

SUMMARY

The present invention provides methods and apparatus, including computer program products, for processing data packets and for implementing computer network security.

Advantages of the invention may include one or more of the following features. The technique disclosed can be used to detect an attempted network security intrusion and potentially block the current packet associated with the security intrusion. The disclosed technique can provide robust and efficient network security and includes plural security devices but only one flow table. Network security information is obtained from other network security devices and stored in a single flow record in the flow table. The use of a single flow record to determine whether a packet should be allowed can result in faster response time.

The details of one or more implementations of the invention are set forth in the accompanying drawings and the description below. Other features and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
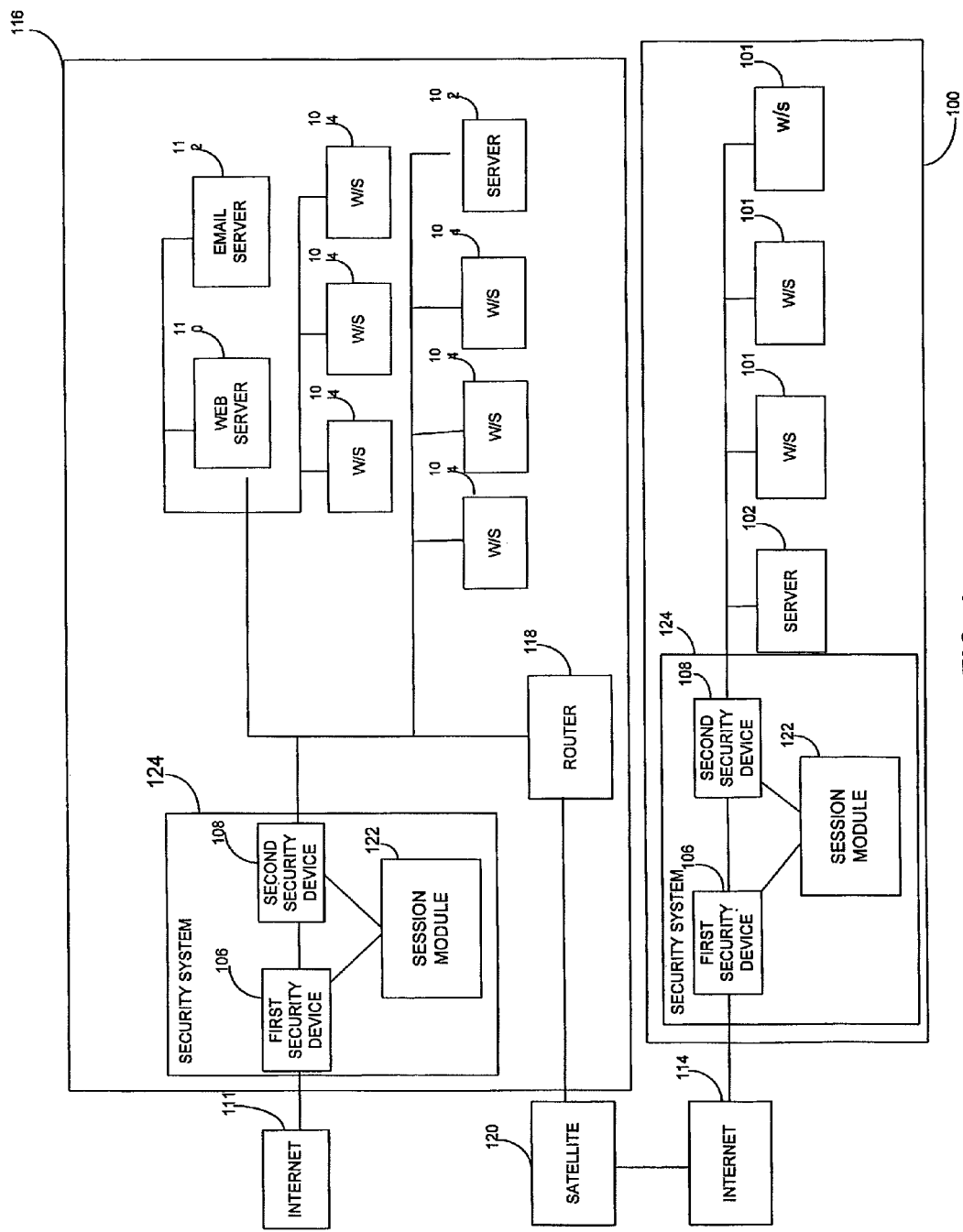
FIG. 1 shows a network topology including a session module.

FIG. 1 shows a network topology including a local area network (LAN) (100), including a server (102), several workstations (W/S) (104), and a security device 124. The security system 124 can include a session module 122 and a plurality of other security devices. In the implementation shown, the security system 124 includes two security devices, a first security device 106 and a second security device 108. The LAN 100 is connected to an external network e.g., the Internet (114), through the security system 124. The LAN 100 is also connected to a second LAN (116) through a router (118), and satellite (120). Second LAN 116 includes a web server (110), an email server (112), a server 102, several workstations 104 and a security system 124. The computers, servers and other devices in the LAN are interconnected using a number of data transmission media such as wire, fiber optics, and radio waves. The session module 122 monitors packets being communicated within the network. In one implementation, the first security device 106 can be a firewall and the second security device 108 can be an IPS. The session module 122 can act in conjunction with the first security device 106 and the second security device 108 to facilitate the blocking of packets associated with an attempted network security intrusion.

Figure 2:
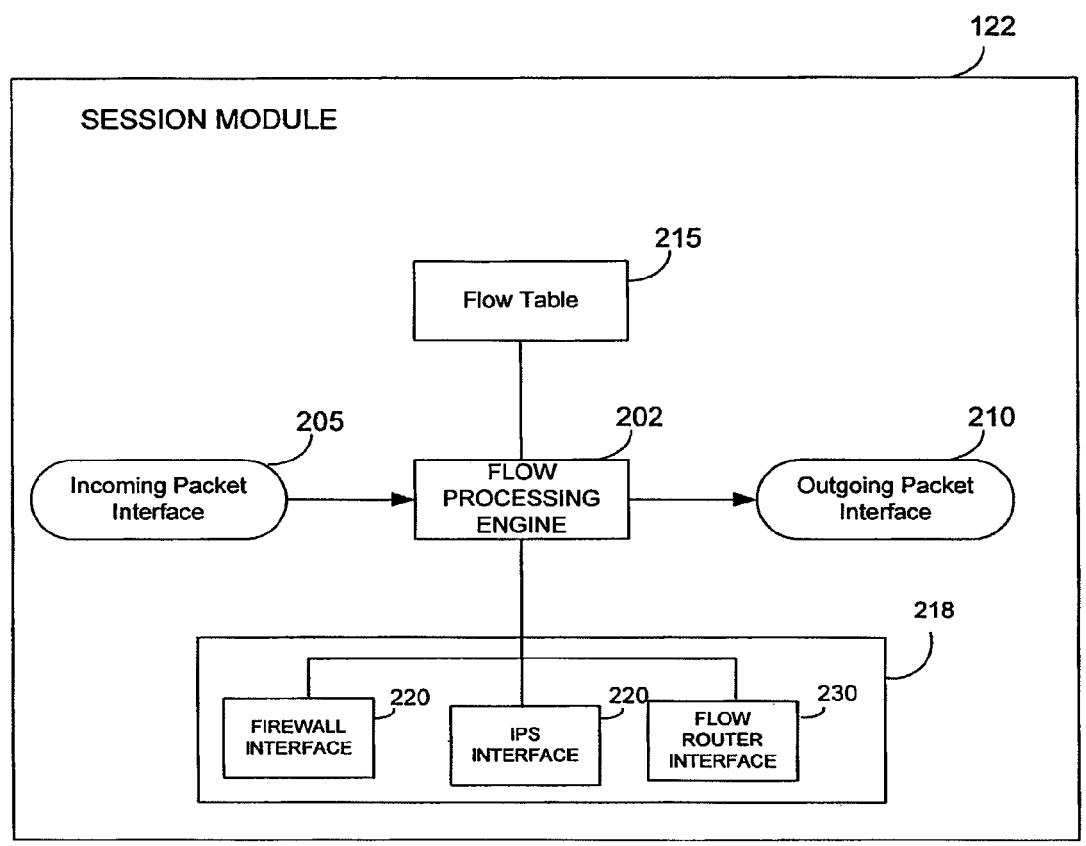
FIG. 2 illustrates a block diagram of the session module.

FIG. 2 shows a block diagram of a session module 122. The session module 122 includes an incoming packet interface 205 for receiving packets. The received packets are analyzed by a flow processing engine (FPE) 202 to determine if an attempted network security intrusion is in progress. The session module 122 also includes a flow table 215. The flow table 215 is used to store information regarding flows associated with received packets. The session module 122 also includes interfaces to other security devices on the network. In one implementation, the session module 122 includes a firewall interface 220, an IPS interface 225, and a flow router interface 230. The security device interfaces 220 are used by the session module to obtain information regarding the received packet, and information regarding the flow associated with the packet, in order to determine if the received packet should be allowed or modified. The security device interfaces 218 are also used by the session module 122 to communicate flow information required by the security devices to facilitate processing of the packet.

Figure 3:
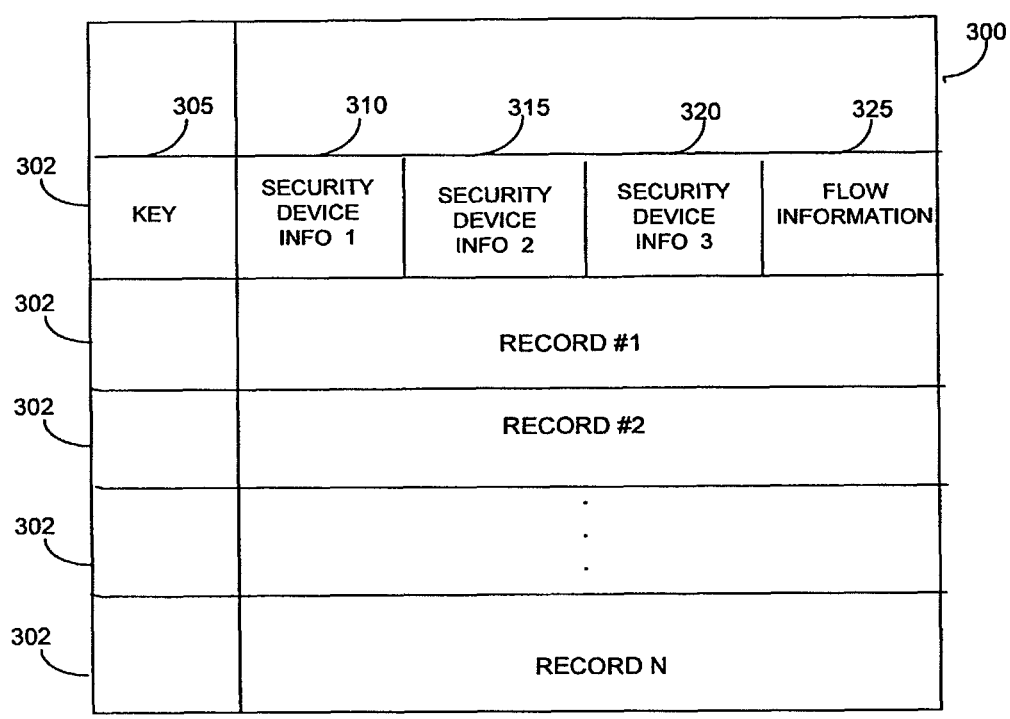
FIG. 3 shows the structure of a flow table.

FIG. 3 illustrates a structure of a flow table 300. The flow table 300 includes flow records 302 associated with current TCP/IP flows. A TCP/IP flow includes a sequence of data packets communicating information between a source and a destination in one direction. The flow records are indexed using an indexing key 305. The indexing key 305 is used to store and retrieve the appropriate flow record associated with a received packet. In one implementation, the indexing key 305 can be a hash key and the flow table 300 can be implemented as a hash table. The session module 122 (FIG. 2) stores instructions for two or more security devices on the network in the same flow record. In one implementation of the session module 122, instructions for three security devices (i.e. devices 310, 315, and 320) are stored in the flow record 302. The flow record 302 can store policy information (firewall policy, IPS policy etc., to apply to the flow) as well as other information that is used by the security devices such as encryption parameters, address translation parameters, bookkeeping information, and statistics. The flow record 302 can also include flow information 325 required by the session module 122 in order to decide whether the packet should be allowed. Such information can include information required to implement network policies regarding, for example connection time out, time billing, and bandwidth usage. Flows, sessions and flow tables are described in greater detail in co-pending and commonly owned patent application entitled "Multi-Method Gateway-Based Network Security Systems and Methods," and assigned Ser. No. 10/072,683, the contents of which are expressly incorporated herein by reference.

Figure 4:
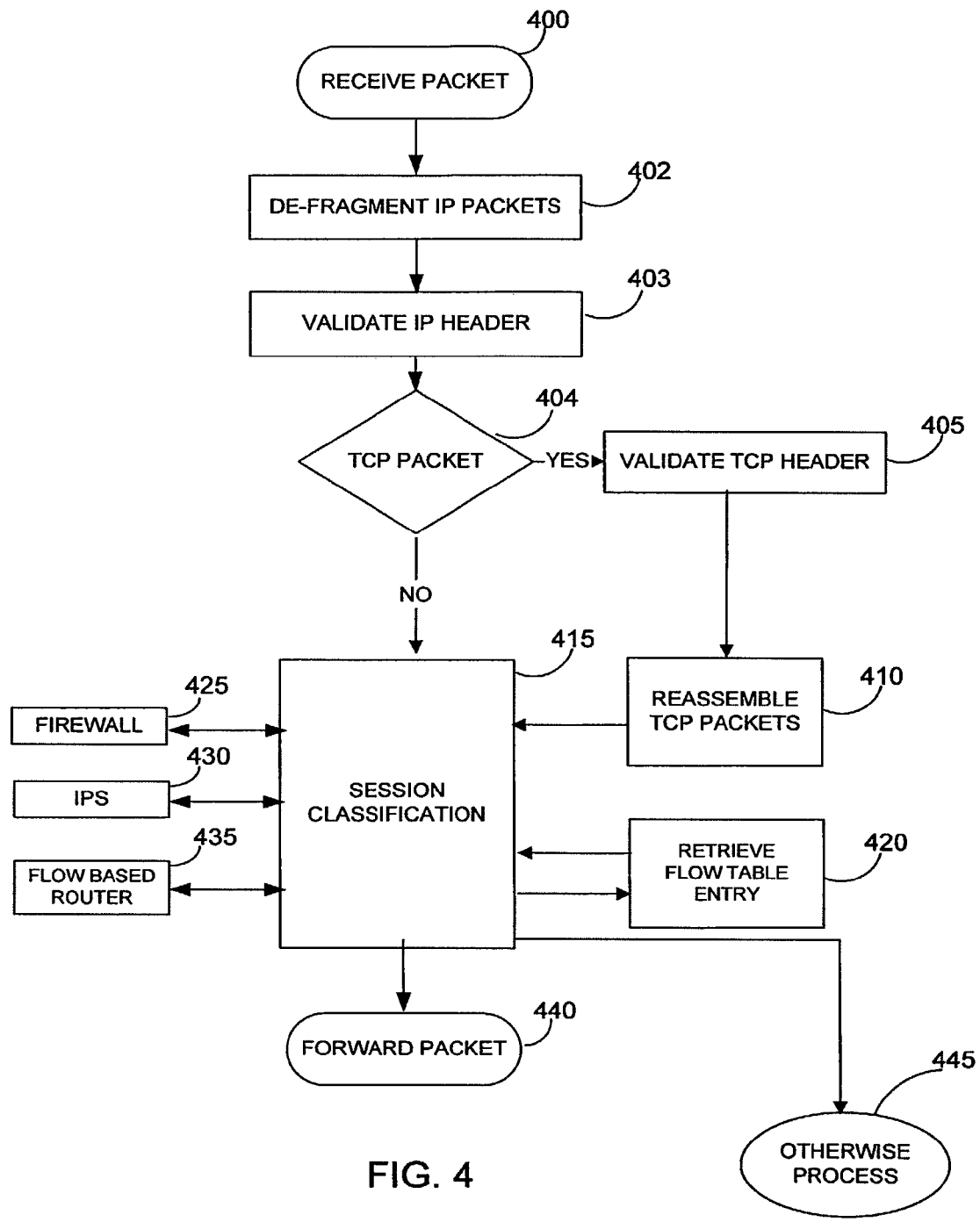
FIG. 4 is a flowchart describing the operation of the session module.

FIG. 4 is a flow diagram describing the operation of the FPE 202 (FIG. 2). Referring now to FIGS. 2 and 4, incoming packets are received by the session module (step 400). IP packets are de-fragmented (step 402) and the IP header is validated for each IP packet (step 403). In the validation step, the IP header associated with a given packet is extracted and the extracted IP header is inspected for fundamental flaws. Thereafter FPE 202 determines if the session is to be allowed (step 415).

If the packet is a TCP packet (step 404), the TCP header is validated (step 405) and the TCP packets are reassembled (step 410). The validation process includes extracting TCP header data and evaluating the header for fundamental flaws. The quasi-reassembly information developed in step 410 can be communicated by the session module 122 to other security devices to facilitate processing of the packet by the other security devices. Reassembly is described in greater detail below and in "Multi-Method Gateway-Based Network Security Systems and Methods."

In step 415, FPE 202 performs session classification using the TCP/IP header data associated with a given received packet. The session module 122 can determine if the packet should be allowed based on information obtained regarding the TCP/IP flow associated with the received packet and retrieved from the flow table 420. In addition, the session module 122 can use information returned from one of the other security devices e.g., the firewall 425, the IPS 430, and the flow based router 435. Further, the session module 122 can also facilitate the operation of the security devices by communicating flow information to a respective device as required by the device to process a given packet. Finally, FPE 202 forwards the packet if the packet should be allowed (step 440). Otherwise, the packet is otherwise processed at step 445. Other processing can include logging particular information regarding the packet, holding the packet, modifying and/or dropping the packet. This completes the description of the operation of FPE 202.

Figure 5:
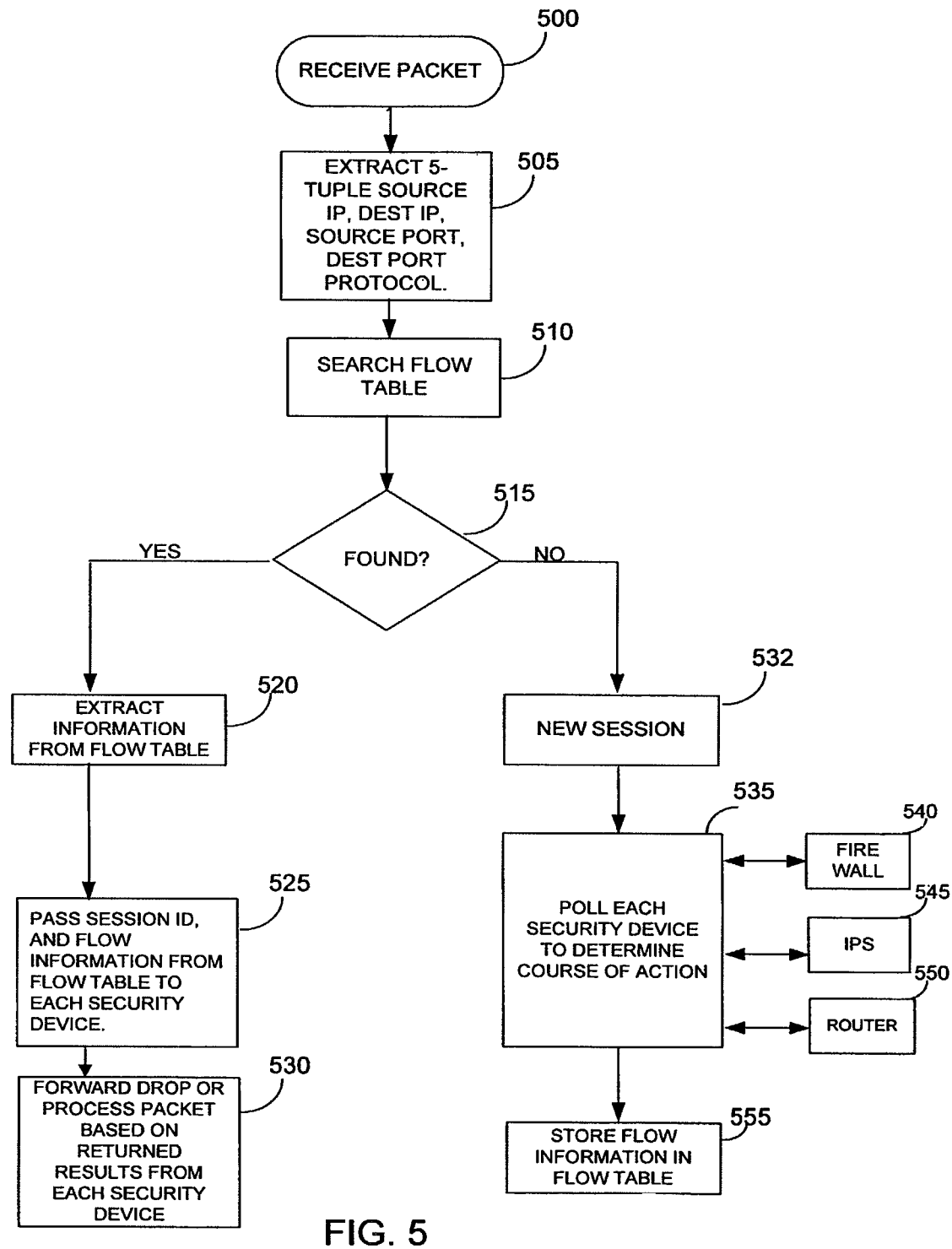
FIG. 5 is a flowchart describing session classification.

FIG. 5 is a flow diagram showing the steps included in session classification (step 415). The session classification step receives a packet (step 500) and extracts information required to determine whether the packet should be allowed. The extracted information can include the source and destination IP addresses, the source and destination port numbers, and the protocol (step 505). The extracted information can be used to search the flow table (step 510) in order to determine if the packet is associated with a known session flow. For a known session flow, step 510 will produce a matching flow record in the flow table (step 515). If a matching flow record is found, the FPE 202 (FIG. 2) can extract TCP/IP session information for the received packet (step 520) from the matching flow record. The FPE 202 determines if the received packet should be allowed using the TCP/IP session information obtained during step 520. More specifically, the FPE 202 extracts information from the matching flow record, and passes the information to the security devices (e.g., communicating the session ID and the TCP/IP session information as well as any other security device specific information from the flow record) (step 525). Depending on the returned results from the security devices, the FPE 202 can forward, drop, log, store, modify or otherwise process the given packet (step 530).

If a matching flow record is not found in the flow table during step 515, the received packet can be associated with a new TCP/IP session (step 532). For a new TCP/IP session, the FPE 202 can assign a session ID to the new session and the FPE 202 can communicate with the other security devices (e.g. firewall, IPS, flow router) to determine a security policy for packets associated with the new session. For example, the FPE 202 can obtain information from the firewall 540 in order to determine if received packets associated with the new session should be allowed. The FPE 202 can communicate with the IPS 545 in order to determine if the received packet should be blocked because it matches known attack signatures for attempted network security intrusions. The FPE 202 can obtain any network policy associated with the new session from the flow router 550. The FPE 202 can act as an arbiter between the different security devices and use the information obtained from the security devices either individually or in combination to determine if the packets associated with the new TCP/IP session should be allowed. The FPE 202 can use the information obtained from the security devices to create a new flow record and store the new flow record in the flow table (step 555). The new flow record includes the TCP/IP session information for the new session associated with the received packet and any other specific security device information. Thereafter, the FPE 202 can facilitate the processing of received packets associated with a given TCP/IP session as described above in association with FIG. 4 including communicating the session ID, TCP/IP session information and security device specific information to the security devices from a corresponding flow record.

Figure 6:
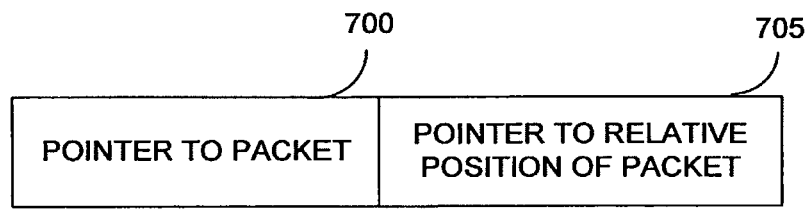
FIG. 6 shows the quasi-reassembly information generated by the session module.

In addition to determining if a received packet is associated with an attempted network security intrusion using the varied security devices, the session module can also perform quasi-reassembly of the received TCP/IP packets as described above in association with FIG. 4. FIG. 6 shows the quasi-reassembly information that can be generated by the session module. The quasi-reassembly information can include a pointer to a location of a given packet 600 in memory and a pointer to information containing the relative position of the packet in a flow 605. In one implementation, an IPS can perform passive TCP/IP reassembly and the pointer to the location of the packet can be used to locate the packet within the IPS. In another implementation, the pointer to information containing the relative position of the packet in the flow can be used to obtain the TCP/IP sequence number included in the TCP/IP header associated with the packet. The quasi-reassembly information can be communicated to the security devices connected to the session module 122 (FIG. 2) as required. The security devices can use the quasi-reassembly information to process the received packet.

Figure 7:
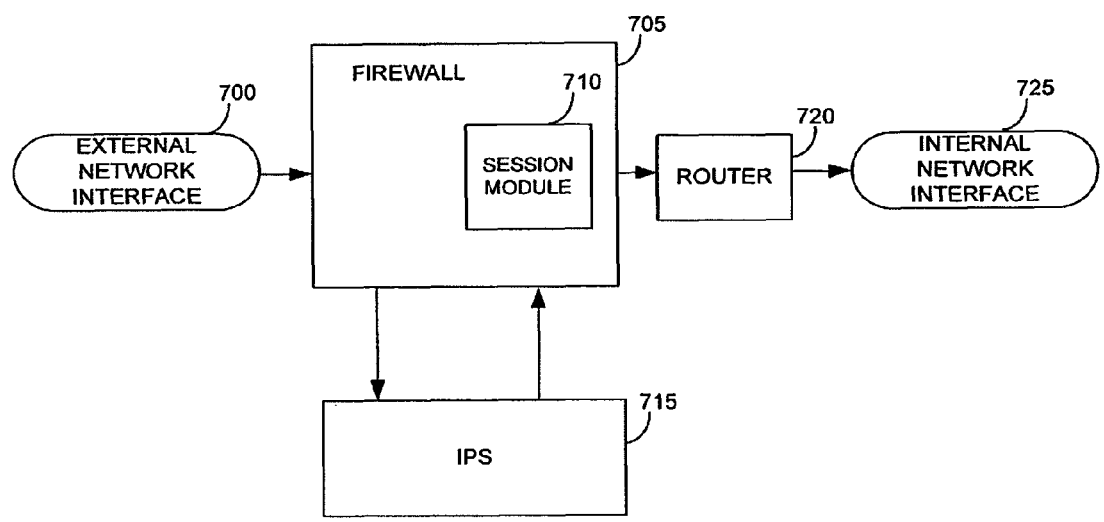
FIG. 7 shows a network topology where the session module is included in a firewall.

The session module can be used in a number of different network topologies. FIG. 7 shows a network topology where a session module 710 is integrated into a firewall 705. The firewall 705 can include an interface to a router 720 and an IPS 715. The firewall 705 receives packets from the external network interface 700. The firewall 705 communicates with the IPS 715 to determine whether the received packet should be blocked based on known attack signatures. If the firewall 705 and IPS 715 determine that the packet should be allowed to pass, the firewall 705 sends the received packet to the router 720. The router 720 forwards the outgoing packet to its intended destination, using the internal network interface 725, based on the network policies stored in the router.

Figure 8:
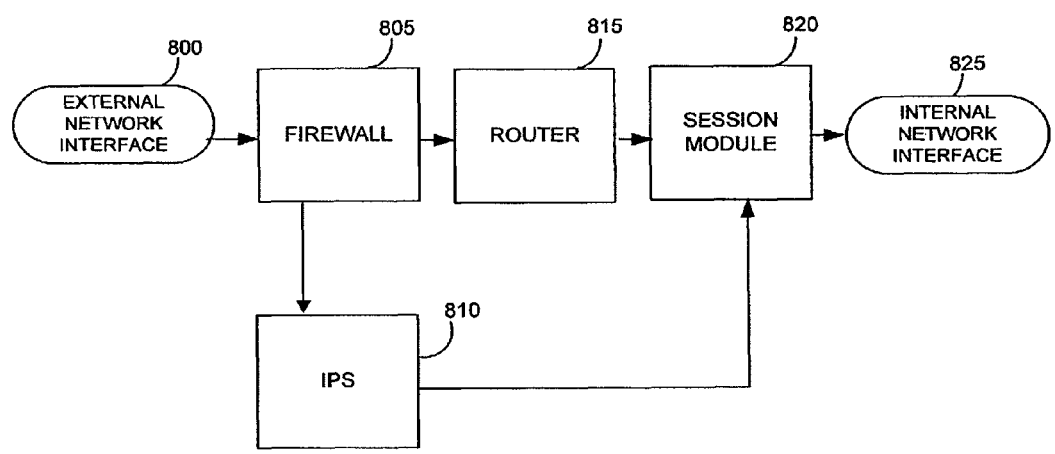
FIG. 8 shows a network topology where the session module operates in series with a firewall, IPS, and router.

FIG. 8 shows an alternate arrangement for implementing computer network security using a session module. In this arrangement, the session module 820 operates in series with a firewall 805, an IPS 810, and a router 815. Packets received using the external network interface 800 are screened by the firewall 805 before being communicated to the router 815. The firewall 805 also sends information regarding the received packet to the IPS 810. The IPS 810 examines the received packet and informs the session module 820 if the received packet should be blocked based on known attack signatures. The router 815 sends the packet to the session module 820 for further processing. If the session module 820 determines that the received packet should be allowed it forwards the received packet to its intended destination using the internal network interface 825.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each and typically interact through a communication network. The relationship of client and server arises by virtue of computer programs running on the respective computers and having a client-server relationship to each other.

Figure 9:
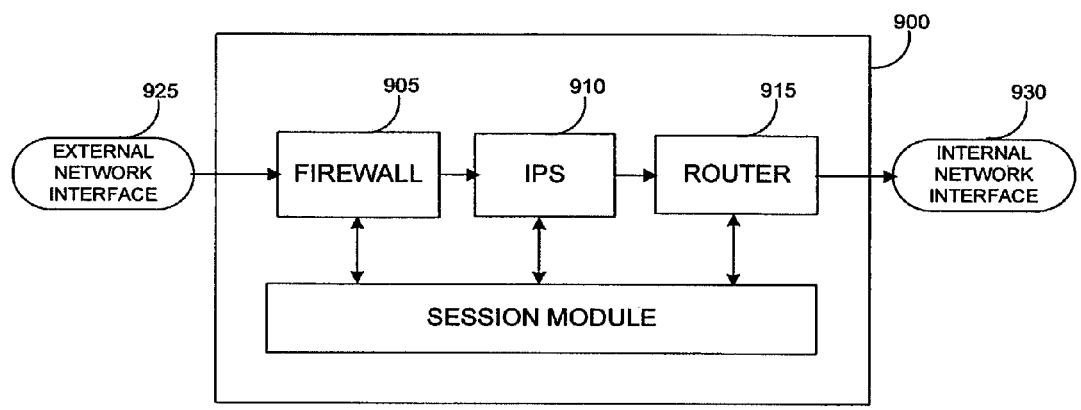
FIG. 9 shows a network topology where a session module, firewall, IPS and router are included in a single security device.

This invention has been described in terms of particular embodiments. Nevertheless, it will be understood that various modifications may be made without departing with the spirit and scope of the invention. For instance, the steps of the invention can be performed in a different order and still achieve desirable results. In addition, the session module, IPS, firewall, and router can all be incorporated into a single device such as the configuration shown in FIG. 9. Other configurations of a session module packaged with one or more security devices are also possible. Accordingly, other embodiments are within the scope of the following claims.

What is claimed is:

1. A method comprising:
   receiving, by one or more processors of a device, a packet in a flow of packets associated with a session;
   determining, by the one or more processors and using data of the packet, that a data structure does not store information identifying the flow of packets;
   communicating, by the one or more processors and to a plurality of security devices, particular information that includes:
      information identifying a location of the packet in a memory associated with the one or more processors, and
      information identifying a position of the packet in the flow of packets, the plurality of security devices being included in the device;
   obtaining, by the one or more processors and from each security device of the plurality of security devices, information relating to processing packets associated with the session,
      the information, relating to processing the packets associated with the session, being obtained from each security device of the plurality of security devices based on determining that the data structure does not store the information identifying the flow of packets;
   creating, by the one or more processors and for storing in the data structure, a single entry for storing the information identifying the flow of packets based on determining that the data structure does not store the information identifying the flow of packets,
      the single entry being created using the information, obtained from each security device of the plurality of security devices, relating to processing the packets associated with the session; and
   processing, by the one or more processors, the packet based on the information, obtained from each security device of the plurality of security devices, relating to processing the packets associated with the session.

2. The method of claim 1, where obtaining, from each security device of the plurality of security devices, the information relating to processing the packets associated with the session includes:
   communicating, with each security device of the plurality of security devices, to determine a security policy for the packets associated with the session.

3. The method of claim 1, where obtaining, from each security device of the plurality of security devices, the information relating to processing the packets associated with the session includes:
   communicating, with a first security device of the plurality of security devices, to determine whether to block the packet based on the first security device determining whether the packet matches one or more attack signatures for one or more attempted network security intrusions.

4. The method of claim 3, where obtaining, from each security device of the plurality of security devices, the information relating to processing the packets associated with the session further includes:
   communicating, with a second security device of the plurality of security devices, to obtain a network policy associated with the session,
      the second security device being different than the first security device.

5. The method of claim 1, further comprising:
   storing the single entry, in the data structure, to obtain a stored single entry,
      the stored single entry including:
         the information identifying the flow of packets,
         session information associated with the session, and
         device-specific information associated with each security device of the plurality of security devices.

6. The method of claim 5, further comprising:
   receiving another packet in the flow of packets associated with the session;
   identifying the single entry, in the data structure, using data of the other packet; and
   processing the other packet based on the single entry.

7. The method of claim 1, where each security device, of the plurality of security devices, includes a different one of an intrusion prevention system, a firewall, or a flow-based router.

8. A non-transitory computer-readable medium storing instructions, the instructions comprising:
   one or more instructions which, when executed by one or more processors of a device, cause the one or more processors to receive a packet in a flow of packets associated with a session;
   one or more instructions which, when executed by the one or more processors, cause the one or more processors to determine, using a portion of the packet, that a data structure does not store information identifying the flow of packets associated with the session;
   one or more instructions which, when executed by the one or more processors, cause the one or more processors to communicate, to a plurality of security elements, particular information that includes:
      information identifying a location of the packet in a memory associated with the one or more processors, and
      information identifying a position of the packet in the flow of packets, the plurality of security elements being included in the device;
   one or more instructions which, when executed by the one or more processors, cause the one or more processors to obtain, from each security element of a plurality of security elements, information relating to processing packets associated with the session,
      the plurality of security elements including a firewall and an intrusion prevention system,
      the information, relating to processing the packets associated with the session, being obtained from each security element of the plurality of security elements based on determining that the data structure does not store the information identifying the flow of packets;
   one or more instructions which, when executed by the one or more processors, cause the one or more processors to create a single entry for storing the information identifying the flow of packets based on determining that the data structure does not store the information identifying the flow of packets,
      the single entry being created using the information, obtained from each security element of the plurality of security elements, relating to processing the packets associated with the session;

one or more instructions which, when executed by the one or more processors, cause the one or more processors to store the single entry in the data structure; and one or more instructions which, when executed by the one or more processors, cause the one or more processors to determine whether the packet is associated with an attempted network security intrusion based on the information, obtained from each security element of the plurality of security elements, relating to processing the packets associated with the session.

9. The non-transitory computer-readable medium of claim 8, where the single entry, stored in the data structure, includes:
the information identifying the flow of packets,
session information associated with the session, and
device-specific information associated with each security element of the plurality of security elements.

10. The non-transitory computer-readable medium of claim 8, where the one or more instructions to determine whether the data structure stores the information identifying the flow of packets associated with the session include:
one or more instructions which, when executed by the one or more processors, cause the one or more processors to determine, using the portion of the packet, that the data structure does not store the information identifying the flow of packets associated with the session.

11. The non-transitory computer-readable medium of claim 10, where the one or more instructions to obtain, from a security element of the plurality of security elements, the information relating to processing the packets associated with the session include:
one or more instructions which, when executed by the one or more processors, cause the one or more processors to communicate, with each security element of the plurality of security elements, to determine a security policy for the packets associated with the session based on determining that the data structure does not store the information identifying the flow of packets associated with the session.

12. The non-transitory computer-readable medium of claim 10, where the one or more instructions to obtain, from each security element of the plurality of security elements, the information relating to processing the packets associated with the session include:
one or more instructions which, when executed by the one or more processors, cause the one or more processors to communicate, with the intrusion prevention system, to determine whether to block the packet based on attack signatures for one or more attempted network security intrusions.

13. The non-transitory computer-readable medium of claim 10, where the plurality of security elements further include a flow-based router, and
where the one or more instructions to obtain, from each security element of the plurality of security elements, the information relating to processing the packets associated with the session include:
one or more instructions which, when executed by the one or more processors, cause the one or more processors to communicate, with the flow-based router, to obtain a network policy associated with the session.

14. A system comprising:
a memory to store instructions; and
one or more processors to execute the instructions to:
receive a packet in a flow of packets associated with a session;
determine, using a portion of the packet, that a data structure does not store information identifying the flow of packets associated with the session;
communicate, to a plurality of devices, particular information that includes:
information identifying a location of the packet in a memory associated with the one or more processors, and
information identifying a position of the packet in the flow of packets;
obtain, from each device of the plurality of devices, information relating to processing packets associated with the session,
the plurality of devices including a firewall and an intrusion prevention system,
the information, relating to processing the packets associated with the session, being obtained from each device of the plurality of devices based on determining that the data structure does not store the information identifying the flow of packets;
create, for storing in the data structure, a single entry for storing the information identifying the flow of packets,
the single entry being created using the information, obtained from each device of the plurality of devices, relating to processing the packets associated with the session; and
determine whether the packet is associated with an attempted network security intrusion based on the information, obtained from each device of the plurality of devices, relating to processing the packets associated with the session.

15. The system of claim 14, where the one or more processors are further to:
store the single entry in the data structure,
the stored single entry including:
the information identifying the flow of packets,
session information associated with the session, and
device-specific information associated with each device of the plurality of devices; and
process another packet, in the flow of packets, using the stored single entry.

16. The system of claim 14, where the plurality of devices further includes a flow-based router.

17. The system of claim 14, where, when obtaining, from each device of the plurality of devices, the information relating to processing the packets associated with the session, the one or more processors are further to:
communicate, with a first device of the plurality of devices, to determine whether to block the packet based on the first device determining whether the packet matches one or more attack signatures for one or more attempted network security intrusions.

18. The system of claim 17, where, when obtaining, from each device of the plurality of devices, the information relating to processing the packets associated with the session, the one or more processors are further to:
communicate, with a second device of the plurality of devices, to obtain a network policy associated with the session,
the second device being different than the first device.

* * * * *